Feb. 10, 1948.   D. G. FAWKES ET AL   2,435,882
VALVE SEAT
Filed March 15, 1944

Inventors:
Donald G. Fawkes &
Frederick R. Venton
By Joseph O. Lange Atty.

Patented Feb. 10, 1948

2,435,882

UNITED STATES PATENT OFFICE 2,435,882

VALVE SEAT

Donald G. Fawkes, Chicago, and Frederick R. Venton, Elmhurst, Ill., assignors to Crane Co., Chicago, Ill., a corporation of Illinois Application March 15, 1944, Serial No. 526,840

3 Claims. (Cl. 251—27)

This invention relates to seat rings for valves and has for an object the provision of a flexible, flat, annular seat ring adapted to yieldably resist pressure applied thereto in closing a valve and reassume its normal shape when the pressure seating load is released therefrom.

In the manufacture of globe valves it is possible to substantially reduce the cost thereof by providing flat seat ring faces on discs in place of the usual frusto-conical seating faces. In tests made to determine the tightness of flat faced seat rings in steam service, it was found that leakage would occur between the seating surfaces when valves of this type were mounted in a horizontal position due to the collection of a few drops of condensate on the outlet side of the seating surfaces and thereby causing localized contraction of the metal. It is, therefore, an object of this invention to provide a flat seat ring adapted to be flexed slightly in yieldably resisting a closing movement of a valve and to thereby store up sufficient potential energy to maintain a seating engagement throughout its circumference even though a portion of the metal thereof should be contracted due to contact with condensate. It has further been found that a flexing movement of one or two thousandths of an inch of the seat ring is sufficient for maintaining a tight leakproof seating engagement of the valve in closed position.

This invention has other novel features, details of construction and arrangement of parts which are hereinafter set forth in the specification and claims and illustrated in the accompanying drawing, forming part thereof, wherein:

Figure 1:
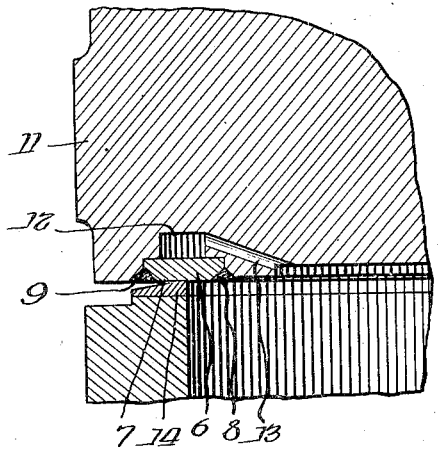
Fig. 1 is a fragmentary detail sectional view showing one form of this invention in which a flat flexible seat ring is welded to a globe valve disc for yieldably resisting closing engagement with a body seating surface, the seat ring being continuously welded to the disc along its inner and outer peripheries.

Referring now to the drawing for a better understanding of this invention and more particularly to Fig. 1 therein, a flat metallic seat ring 6 having a flat seating face 7 is continuously welded along its inner and outer peripheries at 8 and 9 to the face of a disc 11. An annular groove 12 is formed in the disc behind the seat ring to permit inwardly flexing displacement of same. Vent passageways 13 lead from the groove 12 to the face of the disc. The cross-sectional width and thickness of the seat ring 6 and the width of the groove 12 are determined by the pressure load applied to close the valve and the desired rearward flexing displacement of the seat ring along its mean diameter. As heretofore set forth, a displacement of one or two thousandths of an inch has been found to be adequate to provide a leakproof seating surface between the contacting seating surfaces of the seat ring and its complemental body seat 14.

Figure 2:
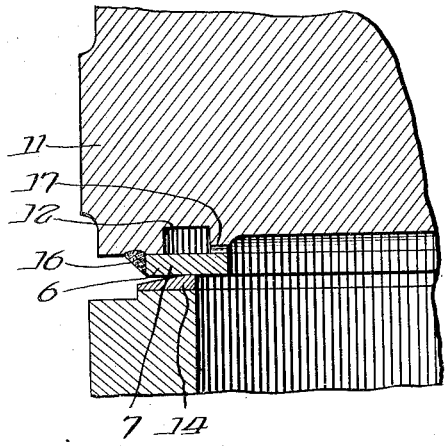
Fig. 2 is a fragmentary detail sectional view showing a modified construction similar to that shown in Fig. 1, and in which the outer periphery only of the seat ring is continuously welded to the disc.

In Fig. 2 the seat ring 6 is shown continuously welded along its outer periphery at 16 to the disc 11, and vent passages 17 are cut in the face of the disc behind the seat ring. The seat ring may be welded along its inner periphery instead of its outer periphery, if desired. In this form of the invention welding stresses are avoided by welding along only one periphery of the seat ring. This form of the invention is otherwise similar to the form illustrated in Fig. 1.

Figure 3:
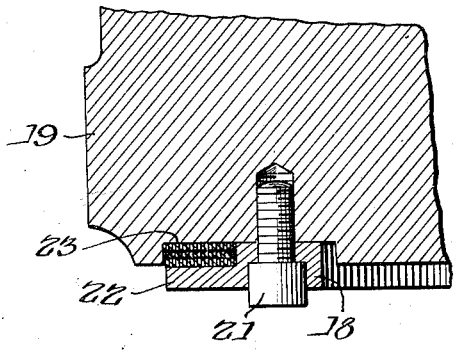
Fig. 3 is a fragmentary detail sectional view showing another modified form of this invention in which a flat seat ring has its inner portion secured to a disc and its outer portion disposed for flexing movement subject to the resiliency or compressibility of an annular reinforcing member disposed behind same.

Fig. 3 illustrates another form of this invention in which a metallic seat ring 18 is secured adjacent its inner periphery to a disc 19 by means of screws 21 and having its outer portion 22 disposed in spaced relation with the face of the disc for the interposition therebetween of a yieldably resistant material or member 23 such as a cross laminated gasket. The member 23 is provided to yieldably resist the pressure applied to the portion 22 in seating the valve and to reassume its normal shape when the valve is unseated.

Figure 4:
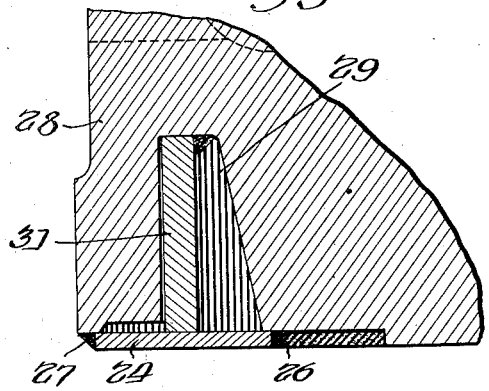
Fig. 4 is a fragmentary detail sectional view showing another modified form of this invention in which a relatively thin flexible seat ring is continuously welded along its inner and outer peripheries to a disc and reinforced by a sleeve disposed behind same.

Fig. 4 illustrates another form of this invention in which a relatively thin flat metallic seat ring 24 is continuously welded along its inner and outer peripheries at 26 and 27, respectively, to the face of a disc 28. An annular groove 29 is formed in the face of the disc behind the seat ring to receive a metallic sleeve 31 which snugly engages the back of the disc adjacent its mean diameter to yieldably resist a flexing inward displacement of the engaged portion of the seat ring when the valve is closed and to reassume its normal shape when the valve is opened.

Figure 5:
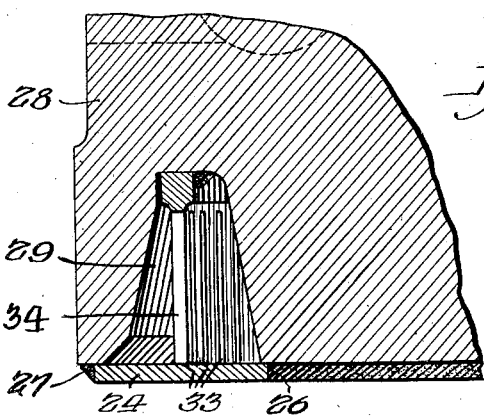
Fig. 5 is a fragmentary detail sectional view showing another modified form of this invention in which a relatively thin flexible seat ring is continuously welded along its inner and outer peripheries to a disc and reinforced by a slotted sleeve disposed behind same.

Fig. 5 illustrates another form of this invention which is similar in construction to the form shown in Fig. 4 except for the provision of slots 33 formed in a metallic sleeve 34 employed for engagement behind the seat ring 24.

In the several forms of this invention it will be seen that localized contraction of a portion of the seat ring in engagement with a body seating surface, caused by a cooling influence of condensate thereon, will not cause a separation of the seating surfaces and resultant leakage, due to the potential energy stored in the flexed seat ring during the closing or seating of the valve and acting with a force equal to the valve seating force to maintain seating contact with the body seat. In other words, localized contraction of the metal forming a portion of the seat ring does not cause a separation of the seating surfaces as it is offset by the subsequent linear movement of the contracted portion of the seat ring.

While this invention has been shown in several forms it is obvious to those skilled in the art that it is not so limited but is susceptible of various changes and modifications without departing from the spirit thereof or the appended claims.

We claim:

1. In a valve, a seating member having a lower face, a flat seat ring formed of relatively thin metal and having its inner and outer peripheries in fluid tight engagement with said face and having an annular seat engaging portion yieldably resistant to seating pressure, said seat ring being substantially continuously welded along at least one of its peripheral edges to the face of said seating member, and yieldably resistant means interposed between the annular seat engaging portion of the seat ring and the seating member, the said latter member having an annular recess or chamber to receive the yieldably resistant means, the said yieldably resistant means consisting of a deflectable sleeve, the axial deflection of the said sleeve due to the seating pressure applied being directly proportional to the height of the sleeve and inversely proportional to its cross-sectional area.

2. In a valve, a seating member having a lower face, a flat seat ring formed of relatively thin metal and having its inner and outer peripheries fixed to said face, and means defining an annular chamber between the seating member and the seat ring to permit inward flexing movement of an annular portion of the seat ring when the valve is being seated, a sleeve fitting shutting the bottom of the annular chamber to abut also against a rear surface portion of the said seat ring opposite the contacting surface portion of the said seat ring, the said sleeve having annularly positioned spaced apart struts at predetermined locations to permit axial deflection thereof whereby the flexibility of the said sleeve is increased.

3. In a valve, a seating member having a face, said seating member having an annular recess formed in the face thereof, and a flat seat ring formed of relatively thin metal covering said recess and having its inner and outer peripheries fixed to the face of the seating member, an annular portion of said seat ring being yieldably resistant to seating pressure when the valve is being closed, a sleeve interposed between a rear portion of the seat ring and a recessed portion of the seating member and being spaced apart annularly from inner and outer walls of the said recessed portion, the said sleeve being of a height to abut both the rear portion of the seat ring and bottom of the recessed portion, an annular portion of the sleeve being substantially reduced in thickness to thereby permit of increased deflection of the said sleeve.

DONALD G. FAWKES.
FREDERICK R. VENTON.

REFERENCES CITED

The following references are of record in the file of this patent:

UNITED STATES PATENTS

| Number | Name | Date |
| --- | --- | --- |
| 926,885 | Lippold | July 6, 1909 |
| 2,131,928 | Abegg | Oct. 4, 1938 |

FOREIGN PATENTS

| Number | Country | Date |
| --- | --- | --- |
| 680,031 | Germany | 1939 |

Certificate of Correction

Patent No. 2,435,882.   February 10, 1948.

DONALD G. FAWKES ET AL.

It is hereby certified that error appears in the printed specification of the above numbered patent requiring correction as follows: Column 4, line 12, claim 2, for the word "shutting" read *abutting*; and that the said Letters Patent should be read with this correction therein that the same may conform to the record of the case in the Patent Office.

Signed and sealed this 20th day of April, A. D. 1948.

[SEAL]

THOMAS F. MURPHY,
*Assistant Commissioner of Patents.*